United States Patent [19]

Scarpelli

[11] 4,394,287

[45] Jul. 19, 1983

[54] INCORPORATION OF FINELY DIVIDED ADDITIVES AT THE SURFACE OF MICROCAPSULE WALLS

[75] Inventor: Joseph A. Scarpelli, Dayton, Ohio

[73] Assignee: Eurand America, Inc., Dayton, Ohio

[21] Appl. No.: 252,919

[22] Filed: Apr. 10, 1981

[51] Int. Cl.³ .............................................. B01J 13/02
[52] U.S. Cl. ................................ 64/4.32; 71/DIG. 1; 252/174.13; 252/543; 252/DIG. 13; 424/35; 424/37; 424/70
[58] Field of Search ........................................ 252/316

[56] References Cited

U.S. PATENT DOCUMENTS

| | | | |
|---|---|---|---|
| 3,179,600 | 4/1965 | Brockett | 252/316 X |
| 3,190,837 | 6/1965 | Brynko et al. | 252/316 |
| 3,574,132 | 4/1971 | Mosier et al. | 252/316 |
| 3,676,363 | 7/1972 | Mosier | 252/316 |
| 4,115,315 | 9/1978 | Marinelli | 252/316 |

*Primary Examiner*—Richard D. Lovering

[57] ABSTRACT

Microcapsules are prepared en masse which contain a substantially water-insoluble core and, incorporated at their surface under a thin film of hydrophilic polymeric colloid, a substantially water insoluble finely divided additive. In the preparation, a primary microcapsule is made in an aqueous vehicle to surround the water-insoluble core, the finely divided additive is then added under stirring to form a fine dispersion and cationic hydrophilic polymeric colloid solution is added to cause the colloid to envelop the additive and deposit it on the capsule wall under a thin film.

6 Claims, No Drawings

INCORPORATION OF FINELY DIVIDED ADDITIVES AT THE SURFACE OF MICROCAPSULE WALLS

BACKGROUND OF THE INVENTION

This invention relates to a process for producing microcapsules, en masse, in an aqueous manufacturing vehicle and to the capsules produced thereby. More particularly, this invention relates to microcapsules containing a substantially water-insoluble additive in the form of finely divided solid or liquid material incorporated at the surface of the microcapsule wall under a very thin polymer film. Microcapsules are capsules of a diameter of about 5–5000 microns. Examples of such substantially water-insoluble additives include pearlescent materials, metal flakes, optical brighteners and solid or dissolved ultraviolet absorbers.

Microcapsules are known, in which additives such as pearlescent agents or carbon black are distributed throughout the capsule wall. Thus U.S. Pat. No. 4,115,315 and patents cited therein teach processes whereby opaque material is dispersed throughout the wall material. In terms of providing an opaquing, or, effect, this procedure is effective. However, if a highly reflective or absorptive surface is desired, deposition of the additive at the surface of the capsule is clearly more effective. The referenced procedures, under manufacturing conditions, have also been found objectionable because some additive tends to find its way into the core material. This is avoided by the present method, in which the additive is applied only after the wall has been deposited in a first microcapsule coating.

It is thus an object of the invention to provide microcapsules having an additive disposed at the surface of the capsule, covered only by a thin film, rather than distributed throughout the capsule wall.

It is a further object of the invention to provide microcapsules in which the core is not adulterated by admixture with the additive.

It is an additional object of the invention to provide a process requiring a shorter reaction time than the processes of the prior art referred to above.

It is also an object of the invention to provide microcapsules in which smaller quantities of additive are needed because of optimal distribution at the surface of the capsule.

These and other objects and advantages provided by this invention will become apparent from a consideration of the following disclosure.

A variety of finely divided powder or liquid additives can be disposed at the outside of microcapsules by the method of the invention, including pearlescent materials, metal flakes, optical brighteners and ultraviolet absorbers. Substantially, water-insoluble solutions of such additives can be employed.

Pearlescent particles especially preferred are typically flat mica carriers or like silicas. In a preferred embodiment of the invention these mica carrier materials are coated with a titanium dioxide pigment. The particles, in the form of platelets, generally have a length of about 5–35 microns along their longest dimension. The amount of titanium dioxide coated on the mica is typically in a range of about 15–50% of the total weight of the particles. A convenient commercially available material is marketed as Satina 100 of Mearl Corporation. Suitable metal flakes are typically finely ground, flattened metals in micron-size particles, the surfaces of which are highly reflective. Especially suitable are such metals as aluminum and nickel, but iron, cobalt and other metals can be employed, depending on the demands of the user, which may depend on electrical, magnetic, incendiary, chromophoric, and other properties of the metal used.

Optical brighteners which can serve as additives for laundry products are materials which, when impinged by ultraviolet radiation, enhances the light emitted in the visible spectum. Typically suitable examples include disodium 4,4[1]-bis (4,6 dianilino-s-triazin-2-ylamino)-2,2[1]-stilbenedisulfonate, known commercially as Arctic White, and 2-hexylamino 1,9-methylpyridinoanthrone (Fluorescent Yellow C-4) and 2-alkyl homologs thereof.

Ultraviolet absorbers suitable for the purposes of this invention are compositions which protect a substrate from potentially harmful utraviolet radiation including carbon black and 5-chlorobenzotriazoles additionally substituted in the 2-position by phenolic groups such as 2-(5-chloro-2H-benzotriazol-2-yl)-6-1,1[1]-dimethylethyl)-4-methylphenol known commercially as Tinuvin 326. Inclusion of an ultraviolet absorber affords protection to agricultural agents which are susceptible to degradation by ultraviolet radiation, as is observed in the case of polyhydrosis virus.

Preferred embodiments of this invention are microcapsules containing as the core material such oily materials as mineral oils, vegetable oils, animal oils, oils prepared by modification of natural oils and oils of purely synthetic origin as halogenated hydrocarbons. Specific examples are white mineral oil such as the product known commercially as Blandol, paraffin oil, cotton seed oil, soybean oil, corn oil, olive oil, castor oil, safflower oil and other fruit skin oils. Representative animal oils are fish oils and lard oil.

The use of cosmetic grade white mineral oil cores is especially preferred for use in microcapsules with pearlescent additives because these products can be added to such cosmetic products as hair conditioners in shampoos. Thus, addition of 0.1–0.4% by weight of the hair preparation provides a formulation useful for dispersing mineral oil into hair on use by rupture of the capsules. The pearlescence in the capsules is visible throughout the liquid hair preparation and produces an aesthetically desirable appearance.

The core material may also be a water-insoluble substance such as a chemical or biological pesticide, a fluorescent or phosphorescent agent.

While the overall sequence of the instant process is new, certain individual steps described in U.S. Pat. No. 4,115,315, issued Sept. 19, 1978 and the prior art cited therein are applicable to the steps of first forming the capsule prior to deposition of the additive, and of hardening the capsule. According to the preferred method of this invention, a primary capsule, having as at least one wall material component an anionic coacervation phase hydrophilic polymeric colloid, is prepared by a conventional separation process. Thus, deposition of colloid around the nuclei of water-insoluble core material can be produced by coacervation and/or phase separation which can be brought about by adjustment of the acidity of a mixture of at least two different colloid polymeric sols in which the core particles or droplets are dispersed. The two kinds of colloids must have different electric charges in the mixture prior to coacervation in order to permit coacervation to occur. As is recognized in the art, one can use salt or polymer-polymer incompatibility for this preliminary step. Hydrophilic colloidal materials suitable include gelatin, albumin, alginates such as sodium alginate, casein, agar-agar, starch, pectins, Irish moss and gum arabic.

Carboxymethylcellulose is a particularly useful negatively charged polymer which forms an excellent liquid polymer coacervate with positively charged gelatin. Other negatively charged polymers, such as gum arabic, carageenan sodium hexametaphosphate, polyvinyl methyl ether, maleic anhydride copolymers such as ethylene maleic anhydride copolymer and polyvinyl methyl ether maleic anhydride copolymer can be used in lieu of carboxylmethylcellulose. However, carboxymethylcellulose is especially desirable for use in the subsequently described process of Example 1, because it is compatible with the post-treatment step using urea-formaldehyde. By way of contrast, substitution of a gelatin-gum arabic capsule requires an intermediate washing or chemical treatment to cause the capsules to accept ureaformaldehyde deposition efficiently.

In a preferred embodiment of this invention, the initial formation of a first or primary capsule is carried out by a conventional coacervation/phase separation technique. As in the usual capsule formation, mentioned above, a colloid is deposited around the nuclei of core material by coacervation/phase separation using positively and negatively charged polymers and adjustment of acidity. It should be noted that microencapsulation is promoted by cooling the batch to 30° and on further cooling to about 20°, solidification satisfactory for the subsequent steps of the inventive method is achieved. In normal capsule manufacture, capsules are typically chilled to about 10° to harden the capsules, as the capsules are cross-linked in the gel state. However, for the purposes of this invention it is sufficient to cause a physical setting of the wall material so as to permit an efficient separation as, for instance, decantation. The stirring is halted when the microcapsule wall has solidified, water is advantageously added and the microcapsules can be separated by decantation. By this decantation, extraneous or undeposited coating material is removed, which would otherwise consume some of the additive to be deposited in the subsequent deposition step, leading to inconstant and non-reproducible results.

In that deposition step, the capsules are first stirred in water, after which the desired additive is added with stirring to form a fine dispersion. The batch is agitated, preferably at a temperature of about 25°–35°, at which a cationic hydrophilic colloid, such as a gelatin solution is added in a small quantity but sufficient to envelope the additive and subsequently deposit it at the surface of the capsule wall under a thin polymer coating as a result of a second chemisorption reaction between the oppositely charged polymer of the film former and the polymer in the wall. Temperatures above 35° are undesirable because the primary capsule walls set arond the core tend to be weakened. On the other hand, if the temperature of the batch is too low, local precipitation of the hydrophilic film forming colloid (such as gelatin) would occur. Where the cationic hydrocolloid used is gelatin, a pH of 3.7 to 4.2 is preferred. Stirring is continued for a few minutes to assure deposition of the additive.

The achievement of deposition of a large amount of additive on the surface of the capsule, using only a small amount of film forming hydrophilic colloid such as gelatin, was unexpected. From the teaching of the prior art, it was believed that an additive such as mica could be deposited efficiently only after thorough washing of the capsules and microencapsulation by a conventional second encapsulation process, using both an anionic and cationic hydrocolloid polymer.

In the subsequent hardening of the capsule, one may employ chilling, but it is more desirable to use a conventional chemical reaction or complexing process using known hardening agents for organic hydrophilic polymers. Suitable hardening agents include glutaraldehyde, formaldehyde, glyoxal, cinnamaldehyde, tannic acid and compounds producing a similar effect on the organic polymer in aqueous media.

After cross-linking with an agent such as glutaraldehyde, the capsules can advantageously be subjected to a plastic treatment by grafting of unreformaldehyde, resorchinol-formaldehyde or other polymers to a gelatin-base or equivalent capsule wall. Advantages in use of the exemplified gelatin-carboxymethylcellulose system in carrying out this post-treatment grafting step are mentioned herein above.

The method of the invention will become more apparent from the following examples which are presented for purposes of illustration and which are not to be construed as limiting the invention.

It will be apparent to those skilled in the art, that reagents and operating conditions can be varied without departing from the scope of the invention.

EXAMPLE 1

Into a two-liter beaker fitted with efficient turbine blades are added 100 grams of a 10% aqueous gelatin solution, 300 grams of distilled water, 60 grams of aqueous carboxymethylcellulose and 10 grams of a 2% aqueous solution of the sodium salt of ethylene maleic anhydride copolymer at pH 5.0 all at 40%.

The aqueous medium is adjusted to pH 4.7 to 4.8 and stirred at 37–40 C. Then 250 milliliters of white mineral oil are dispersed in the mixture to produce oil drops of an average size of 1000 to 3000 microns, care being taken (with certain core material densities) to adjust stirrer speed and height to eliminate layering of oil drops on top of the batch. The batch is then cooled, under agitation, to 30° to cause the coacervate to envelope and encapsulate the oil drops. The batch is cooled to 20° to produce further gelling of the primary microcapsules. Then 200 grams of distilled water of 20° temperature are added to the batch. Stirring is stopped and, after the liquid has reached equilibrium, the aqueous liquid is decanted from the layer of microcapsules.

For the step of deposition of the additive, 100 grams of distilled water are then added and stirring is resumed. After addition of 5 grams of mica particles coated with titanium dioxide, stirring is continued to produce a fine suspension. Under agitation the temperature is raised to 27° and then 10 grams of a 10% aqueous gelatin solution of pH 3.8 are added to the batch. Stirring for about 5 minutes results in deposition of the mica on the microcapsule walls.

With continued stirring the batch is chilled to 10°. At that temperature, 5 milliliters of a 25% aqueous solution of glutaraldehyde are added and the microcapsules are crosslinked to harden the capsule walls by agitation for 3 hours, the temperature rising in the first hour to 15°, and then to 25° in the second hour, at which temperature the batch is maintained until the end of the third hour.

The crosslinking having thus been accomplished, a post-treatment is conducted by adding a solution of 5 grams of urea in 10 milliliters of water and 30 milliliters of a 37% aqueous formaldehyde solution to the batch, stirring for 30 minutes and then lowering the pH of the batch to a pH of 2.0 by addition of a 10% solution of a sulfuric acid. Stirring is continued for a period of 2-3 hours to complete the condensation reaction.

The resulting capsules are washed twice with water and then passed through appropriate mesh sieves to collect the wet capsules.

Examination of the capsules shows with this use of 10 grams of gelatin in the first coacervation step used to build the primary capsule and only 1 gram of additional gelatin in the deposition step, 5 grams of the coated mica were deposited without use of additional anionic polymer. No mica found its way into the core.

EXAMPLE 2

Following the procedure of Example 1, but substituting for the mica an equal weight of nickel flake, there are obtained microcapsules having nickel incorporated in their surface.

EXAMPLE 3

A solution of an ultraviolet absorbing agent is substituted for the mica in the procedure of Example 1. An 8% solution of such absorber is prepared by dissolving 2-(5-chloro-2H-benzotriazol-2-yl)-6-(1,1$^1$-dimethylethyl)-4-methylphenol (Tinuvin 326) in a 1:1 mixture of styrene monomer and of xylene. Instead of the mica, 20 grams of the solution are emulsified into the 100 grams of water, used in the additive deposition step, with a Waring blendor to form droplets of a size of 1 to 5 microns. When the temperature of the preformed capsules and dispersed ultraviolet absorber reach 27° under agitation, the addition of 10 grams of a 10% aqueous solution of gelatin, as illustrated in Example 1, results in the deposition of the Tinuvin mixture on the preformed capsules.

EXAMPLE 4

In the procedure of Example 1, an equal weight of polystyrene beads is substituted for the mineral oil, illustrating suitability of the process for use with solid core microcapsules.

EXAMPLE 5

Into a two-liter beaker, fitted with efficient turbine blades are added 90 grams of an 11% aqueous gelatin solution, 90 grams of an 11% aqueous gum arabic solution and 280 grams of distilled water, all at 40°.

The aqueous solution is stirred without pH adjustment, the pH being naturally between pH 3.8 and 4.2, and 150 milliliters to white mineral oil are dispersed into the mixture to produce oil drops of an average size of 1000 to 3000 microns. Care is taken to adjust the speed and height of the stirrer to eliminate the layering of oil drops on the top of the batch. The batch is then cooled, under agitation, to 28° to cause the coacervate to envelop and encapsulate the oil drops. The batch is cooled to 20° to produce further gelling of the primary capsules. Then 200 grams of distilled water are added to the batch. Stirring is stopped and, after the liquid has reached equilibrium, the aqueous phase is decanted from the layer of microcapsules.

For the step of deposition of the additive, 200 grams of distilled water are then added and stirring is resumed. After the addition of 5 grams of mica particles coated with titanium dioxide, stirring is continued to produce a fine suspension. Under agitation, the temperature is raised to 27° after which 10 grams of a 10% aqueous gelatin solution are added to the batch. Stirring is continued while the batch is chilled to 10°. At that temperature, 5 milliliters of a 25% aqueous glutaraldehyde solution are added and the microcapsules are crosslinked to harden the capsule walls by agitation for 8–12 hours, the temperature gradually rising to about 25° in the course of two hours.

After crosslinking, the capsules are washed. The stirrer is stopped and the liquid layer allowed to reach equilibrium. After decantation of the aqueous liquid from the layer of microcapsules, the latter is stirred with 300 grams of water for 15 minutes. Three or four washes are conducted by repeating the decantation and stirring with distilled water. These washes serve to remove extraneous gum arabic from the capsule wall to facilitate the subsequent post-treatment step.

After the final wash and decantation of the aqueous liquid from the microcapsules, 200 grams of distilled water are added and stirring is resumed. The post-treatment is conducted as in Example 1.

I claim:

1. A method for preparing en masse, in an aqueous manufacturing vehicle, microcapsules with a substantially water-insoluble core and containing incorporated at their surface under a thin polymer film a substantially water-insoluble finely divided additive which comprises the steps of:
    (a) producing an aqueous suspension of microcapsules containing a substantially water-insoluble core material and having as at least one wall material component an anionic hydrophilic polymeric colloid which produces a solid wall around the core,
    (b) then adding substantially water-insoluble finely divided additive under stirring to produce a fine dispersion, and
    (c) adding cationic hydrophilic polymeric colloid solution without further addition of anionic hydrophilic colloid to cause the colloid to envelop the additive and deposit it on the capsule wall under a thin film.

2. The process of claim 1 wherein the core material is an oil.

3. The process of claim 2 for preparing en masse, in an aqueous manufacturing vehicle, microcapsules with a substantially water-insoluble oil core and containing incorporated at their surface under a thin polymer film finely divided pearlescent powder.

4. The process of claim 3 wherein the pearlescent is mica.

5. The process of claim 4 wherein carboxymethylcellulose serves as the anionic hydrophilic polymeric colloid.

6. The process of claim 1 wherein gelatin serves as cationic hydrophilic polymeric colloid.

* * * * *